UNITED STATES PATENT OFFICE.

THOMAS STERRY HUNT, OF MONTREAL, AND JAMES DOUGLAS, JR., OF QUEBEC, CANADA.

IMPROVEMENT IN PROCESSES OF EXTRACTING COPPER FROM ITS ORES.

Specification forming part of Letters Patent No. 86,754, dated February 9, 1869.

*To all whom it may concern:*

Be it known that we, THOMAS STERRY HUNT, of the city and district of Montreal, in the Province of Quebec, in the Dominion of Canada, and JAMES DOUGLAS, Jr., of the city and district of Quebec, in the Province of Quebec, in the Dominion of Canada, being British subjects, and resident in the Province of Quebec, in the Dominion of Canada, have invented a new and useful Improvement in the Art of Extracting Copper from its Ores, constituting a new process for the same; and we do hereby declare that the following is a full, clear, and exact description of the nature and operation of the said improvement and the said process.

For the extraction of copper from its ores by this process it is necessary that it should be in the state of protoxide, or suboxide, or some compound of one of these oxides. Sulphureted ores are, therefore, to be pulverized, and thoroughly roasted or calcined in contact with air, in any suitable furnace—as a reverberatory, muffle, or terrace furnace—from which the sulphurous acid produced may be collected to be made use of in the manufacture of sulphuric acid, or for the treatment of oxychloride of iron, as hereafter described. For the native oxidized ores—as the red or black oxides, the oxychloride, or the carbonates of copper—calcination is not necessary, but they must be well and finely pulverized. The pulverized and naturally or artificially oxidized ores are then digested with a watery solution of a protosalt of iron, with or without the addition of an earthy or alkaline chloride. We prefer the neutral protochloride of iron, which may be conveniently prepared for this purpose by one of the following methods: First, by saturating hydrochloric acid with metallic iron, or native carbonate of iron, or by saturating the same acid with native or artificial oxide of iron, or with the oxychloride of iron produced in a subsequent part of this process, and afterward reducing the higher chloride thus formed by digestion with metallic iron; second, by double decomposition of protosulphate of iron (green copperas) with an equivalent of a soluble chloride—as chloride of calcium, or chloride of sodium; third, by the action of metallic iron on dichloride of copper; and, fourth, by the reducing action of sulphurous acid on oxychloride of iron. These last two methods will, in the continuous working of our process, keep up a sufficient supply of protochloride of iron. By the action of a solution of protochloride of iron on the oxides of copper these are converted into dichloride of copper, which is readily soluble in concentrated solutions of earthy or alkaline chlorides—such as common salt. At the same time the iron separates from the solution as an insoluble oxychloride.

To apply this reaction to the extraction of copper, we begin by preparing the protochloride of iron, by the method described under one and two, according as hydrochloric acid or copperas is cheaper and more available in the locality. One hundred and forty (140) pounds of green copperas, and sixty (60) pounds of common sea-salt, or fifty-six (56) pounds of dry chloride of calcium, or its equivalent of hydrated chloride, are to be dissolved in one hundred (100) imperial gallons of water; or else an amount of protochloride of iron, prepared by one of the methods mentioned, and containing twenty-eight (28) pounds of iron. To the solution prepared in either way two hundred (200) pounds of common salt are then added. These proportions are convenient; but may, in certain cases hereinafter mentioned, be varied with advantage. Such a solution will dissolve about three (3) per cent. of copper in the cold. The pulverized and oxidized ores, prepared as above, are to be digested in the liquid just described, with agitation from time to time. Heat is not necessary, but hastens the solution of the copper, which should not be more than the bath will dissolve. When the solution is complete, and the liquid is drawn off, the residue is to be lixiviated with a small portion of brine, holding from fifteen to twenty per cent. of salt. The united liquids are then digested with metallic iron, by which the copper is thrown down as cement copper, about one part of iron being required for two of copper. To the bath thus freed from copper it is necessary, before using it, to dissolve the oxide of copper from a fresh portion of ore, to add one-half as much protosulphate or protochloride of iron as at first, in order to restore the bath to its original force, so that, in repeating the process, it is required to add seventy (70) pounds of copperas, or its equivalent of protochloride of iron, for each thirty-one (31) pounds of copper dissolved and reduced.

When found desirable, as in places where hydrochloric acid or copperas is costly, the oxychloride of iron formed in the above reaction may be economized by treating it with sulphurous acid, by which it is readily converted into a mixture of soluble protochloride and protosulphate of iron. To this end, the residue, after the solution of the copper, may be exposed to the action of the sulphurous-acid gas from the roasting of sulphureted ores, and afterward lixiviated with a strong brine; or else the dissolving of the oxide of copper, and the conversion of the oxychloride of iron, may be carried on simultaneously, as follows: The oxidized copper ore is added to a bath of protochloride or other protosalt of iron, which may be very much stronger than that above described, with a portion of earthy or alkaline chloride, and digested with agitation in contact with a current of sulphurous-acid gas. In this way the oxychloride is decomposed as soon as formed, and the regenerated protosalts of iron serve to chlorodize fresh portions of oxide of copper. In this modification of the process, by which large amounts of dichloride of copper are formed, a portion of it separates in a solid state, and may be dissolved by a hot, strong brine, which deposits a large part of it on cooling, a property which may be taken advantage of to use the same brine indefinitely by heating and cooling each time. The solid dichloride of copper is rapidly reduced to the metallic state by iron, especially when moistened with brine.

To prevent the partial precipitation of the copper from the dichloride solution in the air, it is well, in all cases, to have a small portion of a protosalt of iron present. A little sulphurous acid will also prevent such precipitation; but any free sulphurous acid should be expelled or allowed to escape from the dichloride solution before decomposing by iron.

The accumulation of sulphate of soda, in cases where protosulphate of iron is used, may be prevented by the use of chloride of calcium, as already explained, which converts the sulphate into gypsum. When sulphurous acid is employed to act upon the oxychloride of iron, both protochloride of iron and sulphate of soda will accumulate in the bath, and may be removed by adding from time to time to a portion—being not more than one-third ($\frac{1}{3}$) of the whole solution—so much lime, in the form of milk of lime, as may be necessary to precipitate the iron in that portion, avoiding an excess of lime. After standing, the clear liquor is to be drawn off and added to the remainder of the solution, when the greater part of the sulphate will be precipitated and the bath restored to its first condition.

We do not claim the use of any particular form of furnace, nor of any special arrangement for calcining, lixiviating, or precipitating, reserving to ourselves the choice of the best forms of apparatus for these purposes; neither do we claim the use of protosalts of iron, otherwise than in solution; nor the use of perchloride or other persalts of iron; nor yet the use of sulphurous acid, save and except in connection with protosalts of iron, as already set forth.

What we claim as our invention is—

1. The use and application of a solution of neutral protochloride of iron, or of mixtures containing it, for the purpose of converting the oxide or suboxide of copper or their compounds, into dichloride of copper.

2. The use of sulphurous acid for the purpose of decomposing the oxychloride of iron formed in the preceding reaction.

3. The use of a process for the purpose of extracting copper from its oxidized ores by the aid of the first, or the first and second, of the above reactions, substantially in the manner already set forth.

Montreal, Canada, January 11, 1869.

THOMAS STERRY HUNT. [L. S.]
JAMES DOUGLAS, Jr. [L. S.]

Witnesses:
EDWD. HARTLEY,
CHARLES ROBB.